United States Patent [19]

Rehmann et al.

[11] 4,420,738
[45] Dec. 13, 1983

[54] TEMPERATURE SENSOR

[75] Inventors: Wolfgang Rehmann, Asperg; Rudolf Sauer, Benningen, both of Fed. Rep. of Germany

[73] Assignee: Robert Bosch GmbH, Stuttgart, Fed. Rep. of Germany

[21] Appl. No.: 306,976

[22] Filed: Sep. 29, 1981

[30] Foreign Application Priority Data

Nov. 26, 1980 [DE] Fed. Rep. of Germany ....... 3044419

[51] Int. Cl.³ .............................................. H01C 7/04
[52] U.S. Cl. .................................. 338/28; 338/22 R; 374/185; 374/209
[58] Field of Search ................... 338/22 R, 225 D, 25, 338/28; 374/138, 148, 183, 185, 208, 209, 144, 145

[56] References Cited

U.S. PATENT DOCUMENTS 3,868,620 2/1975 McBride, Jr. et al. ............... 338/28
4,246,786 1/1981 Wiemer ........................ 338/22 R X Primary Examiner—C. L. Albritton
Attorney, Agent, or Firm—Edwin E. Greigg

[57] ABSTRACT

A temperature sensor is proposed which is intended in particular for measuring the temperature of the air aspirated by an internal combustion engine which operates by electronic fuel injection. The temperature sensor includes a carrier body receiving electrical connections and a temperature-dependent electrical resistor element which is surrounded by a protective sheath. The protective sheath has apertures which permit free access to the temperature-dependent electrical resistor element by the medium to be measured. The protective sheath is advantageously capable of being connected in a positively-engaged manner with a protruding catch of the carrier body. As a consequence of the free access of the medium to be measured to the temperature-dependent electrical resistor element, a very short response time on the part of the temperature sensor to changes in temperature is assured.

7 Claims, 3 Drawing Figures

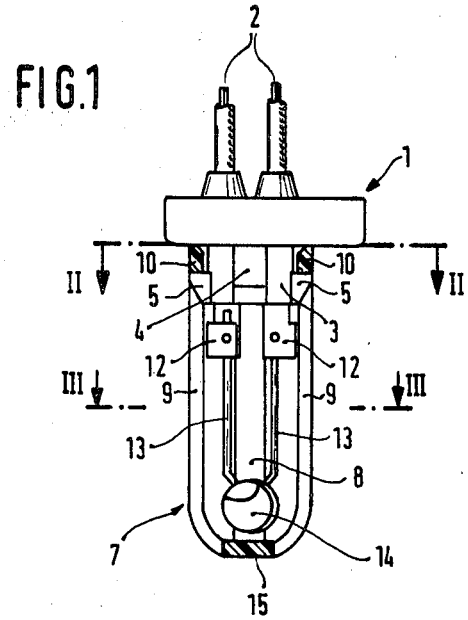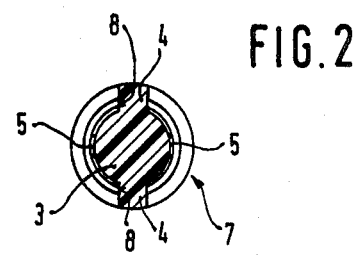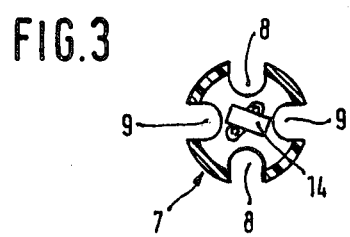

TEMPERATURE SENSOR

BACKGROUND OF THE INVENTION

The invention is directed to improvements in temperature sensors having a carrier body, a temperature-dependent resistor element, and a protective sheath about said resistor element. A temperature sensor is already known in which the temperature-dependent electrical resistor element is completely surrounded by a protective sheath in order to protect it from adverse mechanical and chemical influences. As a result, when there are changes in temperature there is a relatively long delay period until the temperature-dependent electrical resistor element has detected the temperature change. When a temperature sensor of this kind is used to measure the air intake temperature of the internal combustion engine, such a delay in temperature detection means that the electrical fuel injection system controlled by this temperature sensor will be undesirably "late" in correcting for an excessively rich or excessively lean fuel-air mixture; in consequence, the proportion of toxic components in the exhaust gas is increased, and there may be an impairment in engine smoothness as well as an increase in the engine's tendency to knock or detonate.

OBJECT AND SUMMARY OF THE INVENTION

It is an object of the invention to provide a temperature sensor having the advantage over the prior art that the time for response to temperature changes is shortened considerably; thus, when it is used in an electronic fuel injection system, there is not only a saving in fuel but also a reduction in the proportion of toxic exhaust gas components during engine warmup and during other changes in the temperature of the aspirated air occurring during engine operation.

It is another object of the invention to provide that the carrier body and the protective sheath are capable of being connected together in a positively-engaged manner.

It is still another object of the invention to make the carrier body and the protective sheath of an electrically insulating material, especially plastic.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 shows a temperature sensor in accordance with the invention, in which the protective sheath has been cut-away for viewing;

FIG. 2 is a section taken along the line II—II of FIG. 1; and

FIG. 3 is a section taken along the line III—III of FIG. 1.

DESCRIPTION OF THE PREFERRED EMBODIMENT

In the temperature sensor shown in FIGS. 1-3, a carrier body 1, preferably of plastic, is provided with electrical connecting cords 2 molded into it. On the side remote from the connecting cords 2, the carrier body 1 is provided with a protruding catch 3. The protruding catch 3 is provided with two guide tangs 4 (best shown in FIG. 2) protruding in opposed relation beyond the circular cross section of the protruding catch 3 and with two raised lock dogs 5 opposite one another and displaced by approximately 90° from the two guide tangs 4. The lock dogs 5 extend only over a portion of the axial length of the protruding catch 3. A protective sheath 7 closed at one end is pushed into place over the protruding catch 3 and is provided with apertures 8 in opposed relation to one another and extending in the axial direction. These apertures 8 are open toward the protruding catch 3 and have approximately the same width as the guide dogs 4, which they engage laterally. Two further apertures 9 are provided in opposed relation to one another and rotated by approximately 90° from each aperture 8. On an extremity oriented toward the protruding catch 3, the apertures 9 are provided with a crosspiece 10, which closes them. The crosspiece 10, serving as a lock element, engages the respective lock dog 5 from behind when the protective sheath 7 has been pushed into place over the protruding catch 3, thus effecting a positively-engaged axial fixation of the protective sheath 7 on the protruding catch 3. In order to make it easier to push the protective sheath 7 into place over the protruding catch 3, the lock dogs 5 and the end face of the protective sheath 7 have been beveled in a suitable manner. The protective sheath 7 is advantageously fabricated of plastic. When the protective sheath 7 is put into place, it is possible because of the apertures 8 to spread it apart until the crosspieces 10 of the protective sheath 7 snap home behind the lock dogs 5 of the protruding catch 3.

Electrically conductive connecting tabs 12 are likewise molded into the carrier body 1; these are connected at one end to the connecting cords 2 which protrude out of the catch 3 at the other end. Rigid connecting wires 13 are joined to the connecting tabs 12, by soldering or clamping for example. The connecting wires 13 establish the electrical connection to a temperature-dependent resistor element 14 disposed on the other end and serve to guide this resistor element 14 inside the protective sheath 7 in a non-contacting manner, or as much as possible in a non-contacting manner. The temperature-dependent resistor element, preferably having a negative temperature coefficient (NTC resistor), is held by the connecting wires 13 in the vicinity of the base 15 of the protective sheath 7 in such a manner that it is exposed in the most favorable possible manner to the medium flowing in via the apertures 8, 9 and thus detects temperature changes as quickly as possible. In order to protect against adverse chemical influences, it may be advantageous to provide the connecting tabs 12, the connecting wires 13 and the temperature-dependent electrical resistor element 14 with a protective paint resistant to such influences.

When used in the intake tube of an internal combustion engine, for instance, the temperature sensor in accordance with the invention has the advantage that while it assures protection of the temperature-dependent electrical resistor element against mechanical and chemical influences, also it responds very quickly to changes in temperature, so that the temperature signal can exert influence on the fuel-air mixture quickly, as is desired.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A temperature sensor, intended in particular for an electronically controlled fuel injection system of an internal combustion engine, having a carrier body, said carrier body provided with electrical connections, said carrier body being further provided with a temperature-dependent resistor element, said carrier body being arranged to be received in a protective sheath surrounding said temperature-dependent resistor element, characterized in that said protective sheath is arranged to minimize contact between said temperature-dependent resistor element and said sheath, said protective sheath being provided with first and second apertures permitting free access to said temperature-dependent resistor element by a medium whose temperature is to be measured, said first and second apertures extending axially of said protective sheath, said first apertures comprising two apertures disposed in opposed relation to one another, said apertures opening on an end remote from said temperature-dependent resistor element, said second apertures comprising two apertures, at least one of which terminates in a crosspiece near said end, said crosspiece comprising a lock element provided on said protective sheath, and said carrier body and said protective sheath being connected together in a positively-engaged manner, said protective sheath having an elastically deformable end remote from said temperature-dependent resistor element, said carrier body provided with a protruding catch, said protective sheath further having a locking means, whereby said protruding catch and said locking means are brought into engagement when said carrier body is fully inserted into said protective sheath.

2. A temperature sensor as defined by claim 1, further characterized in that said protruding catch on said carrier body is provided with at least one lock dog over which said crosspiece can be pushed, whereby said lock dog engages a corresponding second aperture.

3. A temperature sensor as defined by claim 2, characterized in that said protruding catch is further provided with guide dogs to engage said first apertures.

4. A temperature sensor as defined by claim 1, further characterized in that said carrier body and said protective sheath are comprised of electrically insulating material, in particular plastic.

5. A temperature sensor as defined by claim 4, further characterized in that said carrier body is further provided with electrically conductive connecting tabs molded therein, said electrically conductive connecting tabs connected to rigid connecting wires, and said rigid connecting wires supporting said temperature-dependent electrical resistor element on an opposite extremity.

6. A temperature sensor as defined by claim 5, further characterized in that said electrically conductive connecting tabs, said rigid connecting wires and said temperature-dependent electrical resistor element are provided with a protective paint resistant to chemical influences.

7. A temperature sensor as defined by claim 1, further characterized in that said temperature-dependent electrical resistor element possesses a negative temperature coefficient.

* * * * *